US006687336B1

(12) United States Patent
Holeys (10) Patent No.: US 6,687,336 B1
(45) Date of Patent: Feb. 3, 2004

(54) LINE QUALIFICATION WITH NEURAL NETWORKS

(75) Inventor: Lee F. Holeys, Gurnee, IL (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/409,141

(22) Filed: Sep. 30, 1999

(51) Int. Cl.$^7$ .......................... H04M 1/24; H04M 3/08; H04M 3/22
(52) U.S. Cl. ...................... 379/1.04; 379/24; 379/27.01
(58) Field of Search .............................. 379/1.04, 22.02, 379/22.07, 24, 30, 32.02, 27.01; 324/525, 527

(56) References Cited

U.S. PATENT DOCUMENTS

| | | | | |
|---|---|---|---|---|
| 5,128,619 A | * | 7/1992 | Bjork et al. ................. 325/533 |
| 5,404,388 A | * | 4/1995 | Eu ............................... 379/24 |
| 5,758,027 A | | 5/1998 | Meyers et al. ................ 395/21 |
| 5,864,602 A | * | 1/1999 | Needle ........................... 379/6 |
| 5,978,449 A | * | 11/1999 | Needle ........................... 379/6 |
| 6,084,946 A | * | 7/2000 | Beierle ......................... 379/30 |
| 6,091,713 A | * | 7/2000 | Lechleider et al. ......... 370/248 |
| 6,177,801 B1 | * | 1/2001 | Chong ......................... 324/520 |
| 6,215,855 B1 | * | 4/2001 | Schneider .................... 379/22 |
| 6,266,395 B1 | * | 7/2001 | Liu et al. ..................... 379/27 |
| 6,292,468 B1 | * | 9/2001 | Sanderson .................. 370/241 |
| 6,292,539 B1 | * | 9/2001 | Eichen et al. .............. 379/1.04 |
| 6,349,130 B1 | * | 2/2002 | Posthuma et al. ......... 379/1.04 |
| 6,366,644 B1 | * | 4/2002 | Sisk et al. ................. 379/1.04 |
| 6,385,297 B2 | * | 5/2002 | Faulkner et al. ........... 379/1.04 |
| 6,389,109 B1 | * | 5/2002 | Schmidt et al. ............ 379/1.04 |

FOREIGN PATENT DOCUMENTS

| | | | | |
|---|---|---|---|---|
| EP | 0722164 A | 7/1996 | ............. G10L/5/06 |
| WO | WO 9844428 A | 10/1998 | ........... G06F/15/18 |
| WO | WO 00/27134 | * | 5/2000 | |

OTHER PUBLICATIONS

Backer, et al. : "Telephone Access Network Measurements" Telephone Access Network Measurements, XX, XX, 1998, XP002148949, pp. 53–61.

Rye Senjen, et al. : "Hybrid Expert Systems for Monitoring and Fault Diagnosis" proceedings of the Conference on Artificial Intelligence for Applications, US, Los Alamitos, IEEE Comp. Soc. Press, vol. Conf. 9, Mar. 1, 1993; pp. 235–241, XP000379611; the whole document.

Roehrkasten W. : "Messung Von XDSL–Parametern" Nachrichtentechnik Elektronik, DE, Veb Verlag Technik. Berlin, vol. 48, No. 2, Mar. 1, 1998; pp. 20–21, XP000752845, ISSN: 0323–4657, the whole document.

* cited by examiner

*Primary Examiner*—Binh Tieu
(74) *Attorney, Agent, or Firm*—Lance Kreisman (57) ABSTRACT

A method tests a subscriber line. The method includes determining values of electrical line features from electrical measurements on the subscriber line and processing a portion of the values of the electrical features with a neural network. The neural network predicts whether the line qualifies to support one or more preselected data services from the portion of the values.

39 Claims, 10 Drawing Sheets

LINE QUALIFICATION WITH NEURAL NETWORKS

BACKGROUND OF THE INVENTION

This application relates generally to communications networks, and more particularly, to testing communication lines.

Recently, there has been an increased demand for plain old telephone systems (POTS's) to carry high-speed digital signals. The demand has been stimulated by home access to both the Internet and distant office computers. Both types of access typically employ a POTS line as part of the path for carrying digital signals.

POTS's lines were built to carry voice signals at audible frequencies and can also carry digital signals as tones in the near audible frequency range. Modern digital services such as ISDN and ADSL transmit data at frequencies well above the audible range. At these higher frequencies, POTS's lines that transmit voice signals well may transmit digital signals poorly. Nevertheless, many telephone operating companies (TELCO's) would like to offer ISDN and/or ADSL data services to their subscribers.

Telephone lines between a TELCO switch and a subscriber's premises are frequent sources of poor performance at the high frequencies characteristic of ISDN and ADSL transmissions. Nevertheless, high cost has made widespread replacement of these subscriber lines an undesirable solution for providing subscribers with lines capable of supporting ISDN and ADSL. A less expensive alternative would be to remove only those subscriber lines that are inadequate for transmitting high-speed digital data.

To enable limited replacement of inadequate lines, TELCO's have placed some emphasis on developing methods for predicting which subscriber lines will support data services, such as ISDN and ADSL. Some emphasis has been also placed on predicting frequency ranges at which such data services will be supported. Some methods have also been developed for finding faults in subscriber lines already supporting data services so that such faults can be repaired.

Current methods for predicting the ability of subscriber lines to support high-speed digital transmissions are typically not automated and labor intensive. Often, these methods entail using skilled interpretations of high frequency measurements of line parameters to determine data transmission abilities. At a network scale, such tests are very expensive to implement.

The present invention is directed to overcoming or, at least, reducing the affects of one or more of the problems set forth above.

SUMMARY OF THE INVENTION

In a first aspect, the invention provides a method of testing a subscriber line. The method includes determining values of electrical line features from electrical measurements on the subscriber line and processing a portion of the values of the electrical features with a neural network. The neural network predicts whether the line qualifies to support one or more preselected data services from the portion of the values.

In a second aspect, the invention provides a method of constructing a test for qualifying subscriber lines for data transmissions. The method includes obtaining electrical feature and qualification data for sample lines of a training set and determining parameters defining a neural network from the data of the training set. The network is configured to use values of electrical properties of a subscriber line to predict whether the subscriber line qualifies for one or more preselected data services.

In a third aspect, the invention provides a method of testing a subscriber line. The method includes determining values of electrical features of the line from electrical measurements on the subscriber line and forming a vector having the values as components. The method also includes determining whether the vector is a member of a cluster of feature vectors and predicting whether the line qualifies for a data service based in part on the determination of cluster membership. Feature vectors of the cluster are associated with sample lines of a training set.

In a fourth aspect, the invention provides a data storage medium storing a computer executable program of instructions for performing one or more of the above-described methods.

BRIEF DESCRIPTION OF THE DRAWINGS

Other features and advantages of the invention will be apparent from the following description taken together with the drawings in which.

DESCRIPTION OF THE PREFERRED EMBODIMENTS

Measurement and Test Apparatus

Figure 1:
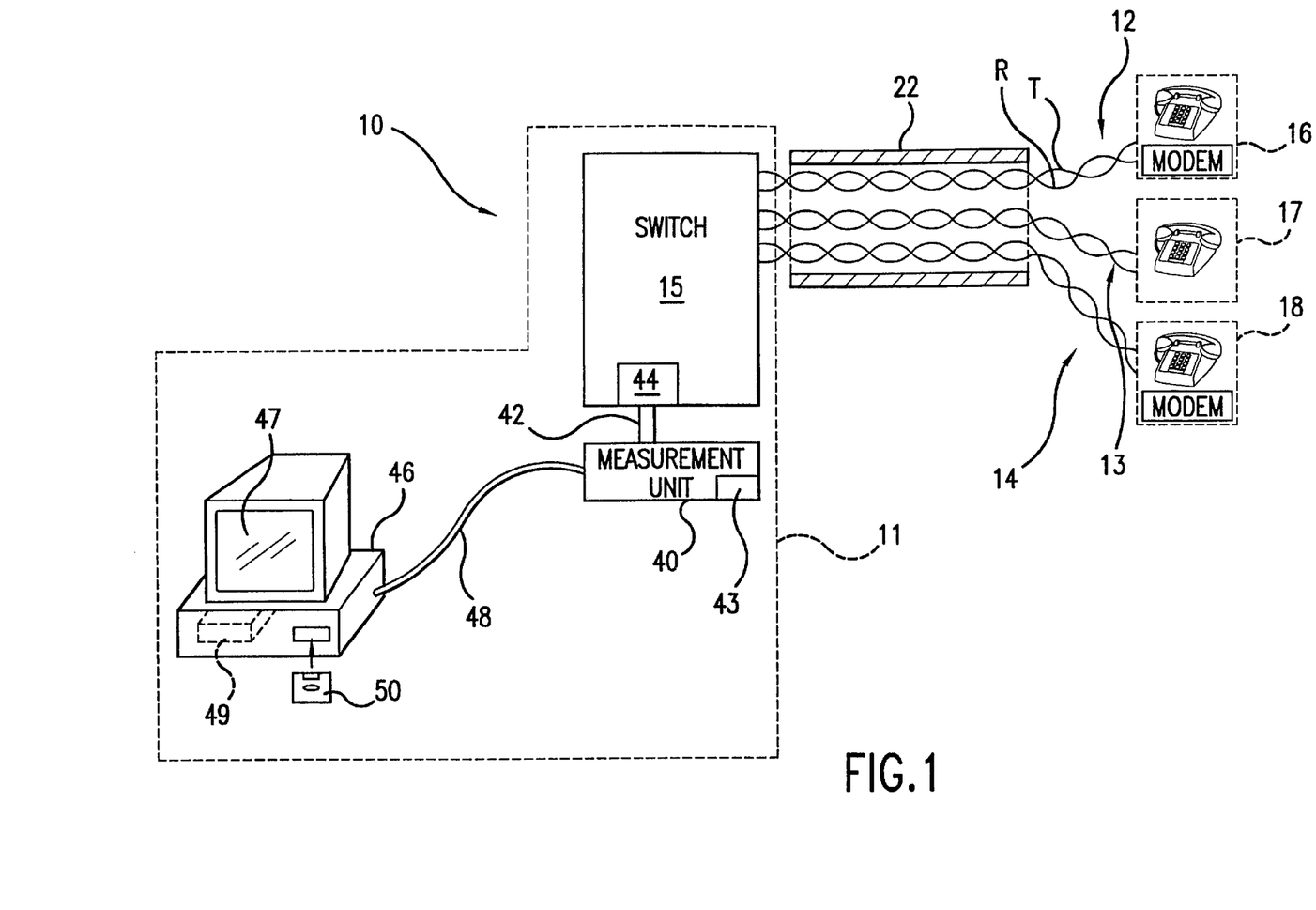
FIG. 1 shows a portion of a POTS network having a system for testing subscriber telephone lines.

FIG. 1 shows a portion of a POTS network 10 that includes a system 11 for testing subscriber lines 12–14. The subscriber lines 12–14 connect subscriber units 16–18, i.e., modems and/or telephones, to a telephony switch 15. The switch 15 connects the subscriber lines 12–14 to the remainder of the telephone network 10. The switch 15 may be a POTS switch or another device, e.g., a digital subscriber loop access multiplexer (DSLAM). The switch 15 and testing system 11 may be located in one or more switching stations of a TELCO.

Each subscriber line 12–14 consists of a standard twisted two-wire telephone line adapted to voice transmissions. The two wires are generally referred to as the ring R and tip T wires.

A large portion of each subscriber line 12–14 is housed in one or more standard telephone cables 22. The cable 22 carries many subscriber lines 12–14, e.g., more than a dozen, in a closely packed configuration. The close packing creates an electrical environment that changes transmission properties of the individual subscriber lines 12–14.

A measurement unit 40 performs electrical measurements, used in tests of the lines 12–14. The measurement unit 40 includes a device 43 that performs one-ended electrical admittance measurements on tip and ring wires of the lines 12–14. The measurement unit 40 may also house other devices (not shown) for performing other types of one-ended electrical measurements, e.g., to test the line for selected line faults. The measurement unit 40 couples to the switch 15 via a test bus 42.

The device 43 connects to the switch 15 through the test bus 42 and a standard voice test access 44. The voice test access 44 electrically connects the device 43 to the subscriber lines 12–14 selected for testing. The voice test access 44 can transmit electrical signals having frequencies between about 100 Hertz (Hz) and 20 kilo Hz (KHz), i.e., low compared to frequencies used by ISDN and ADSL data services.

The measurement unit 40 is controlled by computer 46, which selects the types of measurements to perform and the subscriber lines 12–14 to test. The computer 46 sends control signals to the measurement unit 40 and receives measurement results from the measurement unit 40 via the same line 48.

The computer 46 executes a software program to control line testing by the measurement unit 40. The program also processes and interprets the results from the measurement unit 40 to determine whether to qualify or disqualify the lines 12–14 for preselected high-speed data services. The software program is stored, in executable form, in a data storage device 49, e.g., a hard drive or random access memory (RAM). The program may also be encoded on a readable storage medium 50, such as an optical or magnetic disk, from which the program can be executed.

To perform a test, the measurement unit 40 signals the voice test access 44 to disconnect a selected line 12–14 from the network 10 and to reconnect the line 12–14 to wires of the bus 42 connecting to the internal device 43. Then, the internal device 43 performs one-ended electrical measurements on the selected line 12–14. After the measurements are completed, the measurement unit 40 signals the switch 15 to reconnect the line 12–14 to the remainder of the POTS network 10.

The computer 46 can qualify or disqualify selected subscriber lines 12–14 for data services prior to fully connecting the lines 12–14 to the subscriber units 16–18. Qualification is based on determining, with high certainty, that a selected line 12–14 will support a specified data service. Disqualification is based on determining, with high certainty, that the selected line 12–14 will not support the specified data service.

Figure 2:
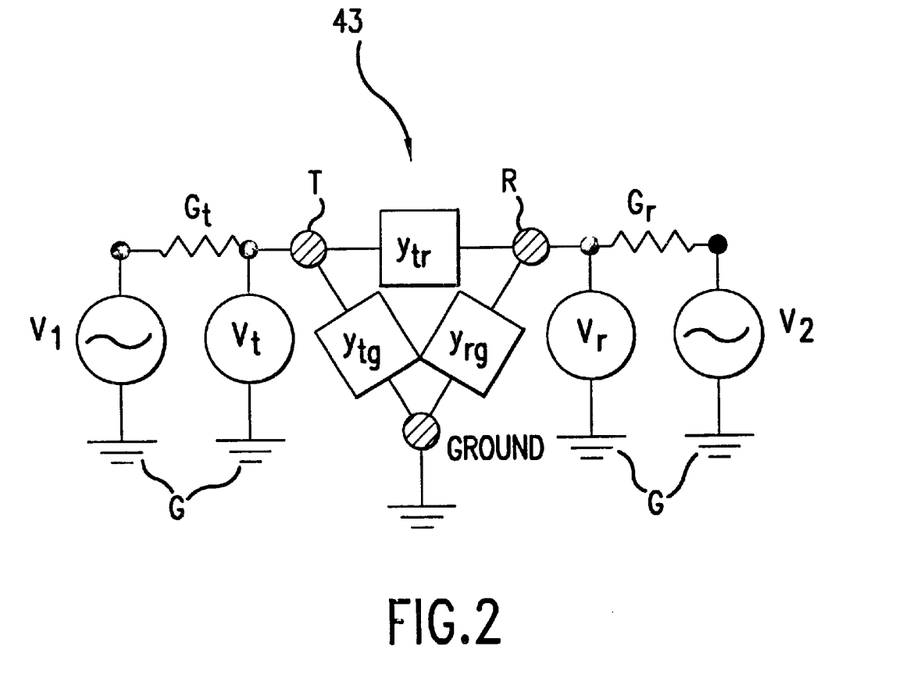
FIG. 2 illustrates a device for performing one-ended electrical measurements on a subscriber line.

FIG. 2 illustrates the device 43 that performs one-ended electrical measurements on the subscriber lines 12–14 of FIG. 1. The measurements may be used to speed qualify each line 12–14 at high frequencies as is described below. The measurements can also be used to detect line faults, such as bridged taps, gauge changes, split pairs, resistive imbalances, load coils, metallic faults such as shorts and open lines, and capacitive imbalances. Methods for detecting such faults with the device 43 have been described in U.S. application Ser. No. 09/294,563 ('563), filed Apr. 20, 1999 and U.S. application Ser. No. 09/285,954 ('954), filed Apr. 2, 1999. These applications are incorporated by reference, in their entirety, in the present application.

The device 43 is adapted to measure admittances between the tip wire T, ring wire R, and ground G for the subscriber line 12–14 being tested. The tip and ring wires T, R of the line 12–14 being tested couple to driving voltage sources $V_1$ and $V_2$ through known conductances $G_t$ and $G_r$. The tip and ring wires T, R also connect to voltmeters $V_t$ and $V_r$. The $V_t$ and $V_r$ voltmeters read the voltage between the tip wire T and ground G and between the ring wire R and ground G, respectively. The readings from the voltmeters $V_t$ and $V_r$ enable the computer 46 to determine three admittances $Y_{tg}$, $Y_{tr}$, and $Y_{rg}$ between the pairs tip-to-ground, tip-to-ring, and ring-to-ground, respectively. The device 43 can measure the admittances $Y_{tg}$, $Y_{tr}$, and $Y_{rg}$ at preselected frequencies of the range supported by the voice test access 44. The '563 application has described the steps for performing such measurements in detail.

The capacity of a subscriber line to support high-speed data transmissions is defined by values of the signal attenuation at high frequencies. For ISDN and ADSL services, the qualification classes for data transmission are defined as follows:

ISDN qualified if attenuation is above −47 dB at 100 KHZ;

ADSL qualified if attenuation is above −40 dB at 300 KHZ;

Disqualified if attenuation is in another range.

Other data services may entail different constraints on the signal attenuation at high frequencies. Nevertheless, qualification for any high-speed data service entails constraints at higher frequencies than the frequencies measured at which the device 43 performs electrical measurements.

Measuring line properties, e.g., the attenuation, directly at the frequencies that define the qualification classes is inconvenient, because the voice test access 44 only supports low frequency measurements. Thus, methods have been developed for extrapolating low frequency measurements to predict the high frequency attenuation. Those extrapolations are prone to inaccuracies and have resulted in mispredictions of line speed qualification status.

Qualification with Neural Networks

As used herein, a neural network is a process that generates, from an input feature vector, a set of confidence values that indicate probabilities of class memberships. The input feature vector has properties of a subscriber line as components, e.g., one-ended electrical measurements and electrical properties derived therefrom. The various embodiments use neural networks in which the classes are qualification classes for high-speed data services or classes of lines with or without selected types of conditions or faults.

Figure 3A:
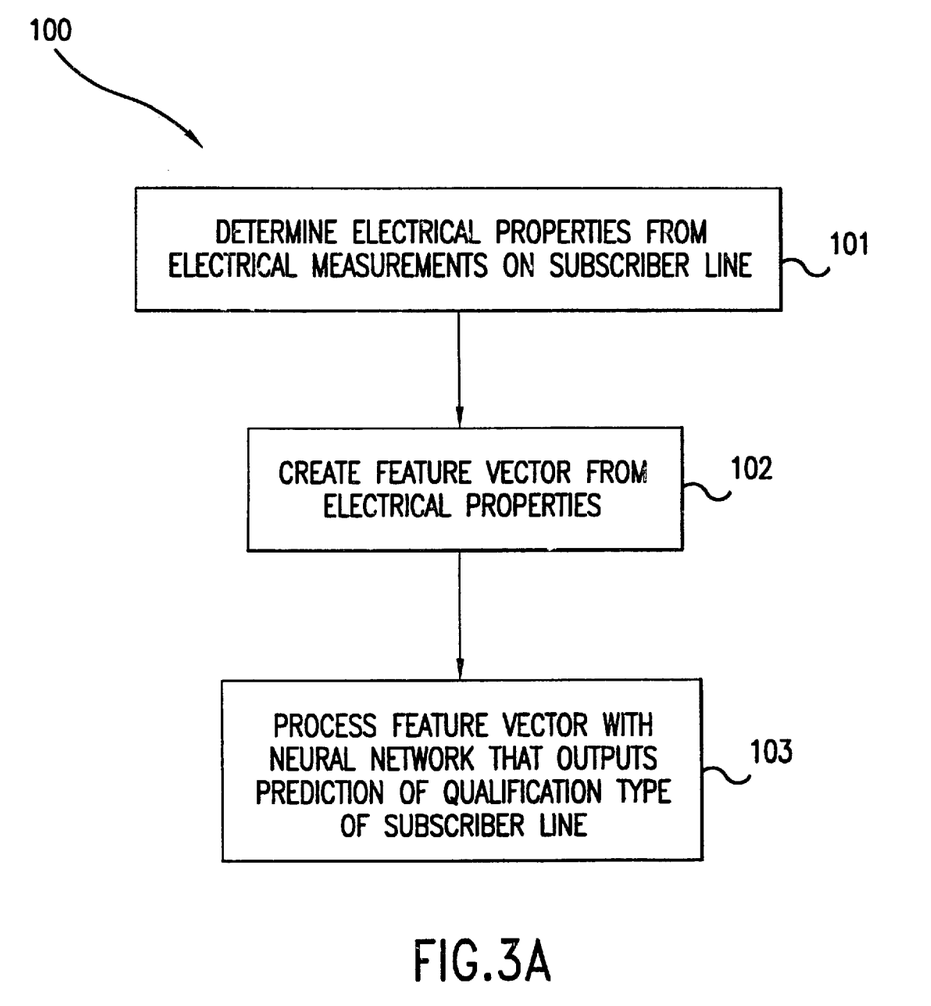
FIG. 3A is a flow chart showing a method of qualifying subscriber lines that uses a feed-forward neural network.

FIG. 3A illustrates a method 100 that uses low frequency measurements and a feed-forward neural network to speed qualify or disqualify the subscriber lines 12–14 for high-speed data services, such as ISDN and ADSL. The neural network can increase the accuracy of qualification tests based on low frequency measurements. For example, one embodiment that uses a first-order neural network has correctly predicted the capacity of unknown subscriber lines to support ADSL and ISDN with an accuracy of more than 90% in test situations.

To test a selected subscriber line 12–14, the system 11 evaluates a set of preselected electrical properties for the selected line 12–14 (step 101). The preselected properties include one-ended electrical measurements made with the measurement unit 40 and other properties directly derived from such measurements. The measured properties include the one-ended admittances $Y_{tg}$, $Y_{tr}$, and $Y_{rg}$, and the derived properties include ratios of admittances and capacitances at preselected frequencies. From the selected electrical properties, the computer 46 creates an electrical feature vector whose ordered components are the values of the preselected electrical properties (step 102). After creating the feature vector, the computer 46 processes the vector with a feed-forward neural network, which has a multi-layered structure (step 103). From an input feature vector, the neural network predicts whether the associated line 12–14 qualifies or disqualifies for a preselected set of high-speed data services, e.g., ISDN and/or ADSL. The neural network is encoded in a portion of the software program, which is stored in the data storage device 49 and/or the readable medium 50 in a computer-executable form.

Some embodiments combine the method 100, based on a neural network, with methods for detecting faults to predict whether a subscriber line qualifies for high-speed data services. In such embodiments, the prediction of whether a line is qualified is based both on the predictions of the neural network and on whether the line has a line fault. For example, the existence of a fault may be a quality factor that can modify the confidence levels for class membership, which are predicted by the neural network.

Figure 3B:
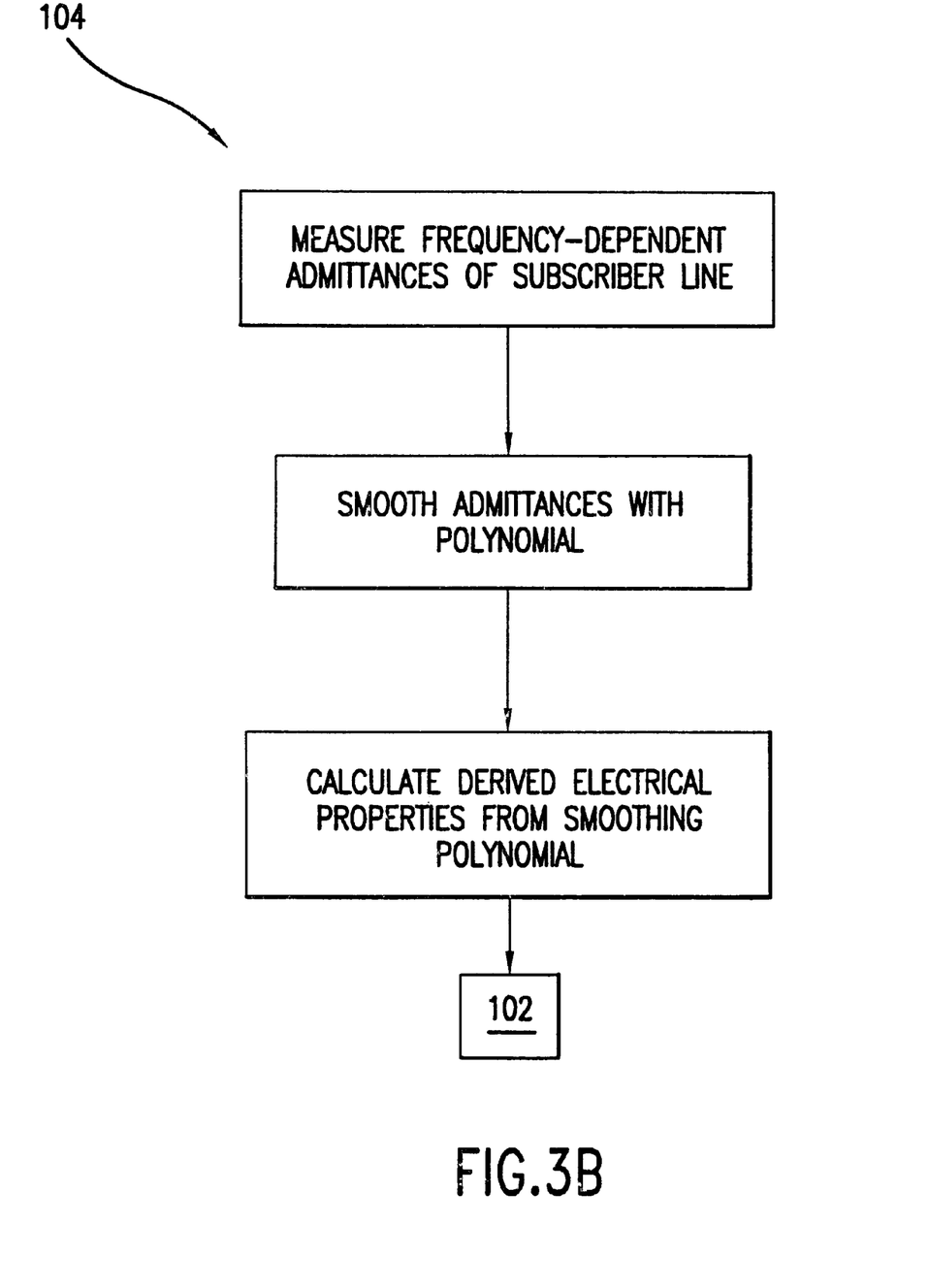
FIG. 3B is a flow chart showing a method of smoothing electrical measurements prior to processing by the neural network of FIG. 3A.

FIG. 3B is a flow chart showing a method 104 of obtaining smoothed electrical properties from one-ended measurements on a subscriber line 12–14. The measurement unit 40 measures admittances $Y_{tg}$, $Y_{tr}$, and/or $Y_{rg}$ of the line 12–14 at a preselected set of frequencies "f" (step 105). One embodiment uses a set of 45 frequencies starting at 150 Hz and having an increment of 450 Hz between adjacent frequencies.

The measurements of the admittances $Y_{tg}$, $Y_{tr}$, and/or $Y_{rg}$ are susceptible to noise. The noise can corrupt the measurements enough to interfere with results obtained from the neural network. To reduce noise interference, the computer 46 smoothes the measured admittances (step 106).

To implement smoothing, the computer 46 expands each measured admittance "$Y_S$" with a polynomial $B^S(f)$ of the form:

$$B^S(f) = \Sigma^D_{j=0} \delta^S_j P_j(f).$$

In the expansion, the $P_j(f)$'s form an orthogonal polynomial basis, e.g., Legendre polynomials. For measurements at the above-described forty-five frequencies, an expansion with the eight lowest $P_j(f)$'s can produce adequate smoothing, i.e., D=8. The computer 46 determines the coefficients, $\delta_j$, from the measured $Y_s(f)$'s using the formula:

$$\delta^S_j = <Y_s(f), P_j(f)>.$$

Here, $<,>$ is the inner product for which the $P_j(f)$'s are othonormal. The values of the polynomials $B^S(f)$ at a preselected set of frequencies "f" define the measured impedances of the line 12–14, which are inputted into the neural network. In the polynomial $B^S(f)$, noise effects are reduced by averaging.

The computer 46 calculates derived electrical properties from the polynomial $B^S(f)$ instead of directly from measurements (step 107). The derived properties may include capacitances, ratios of admittances and derived properties at fixed frequencies, ratios of admittances to frequency, and peaks and valleys of the frequency-dependent admittances.

Again, the use of the smoothing polynomial, $B^S(f)$, to calculate these properties reduces noise effects. In step 102 of FIG. 3A, the feature vector for the subscriber line 12–14 is a concatenation of measured and derived electrical properties that have been determined from $B^S(f)$.

Figure 4A:
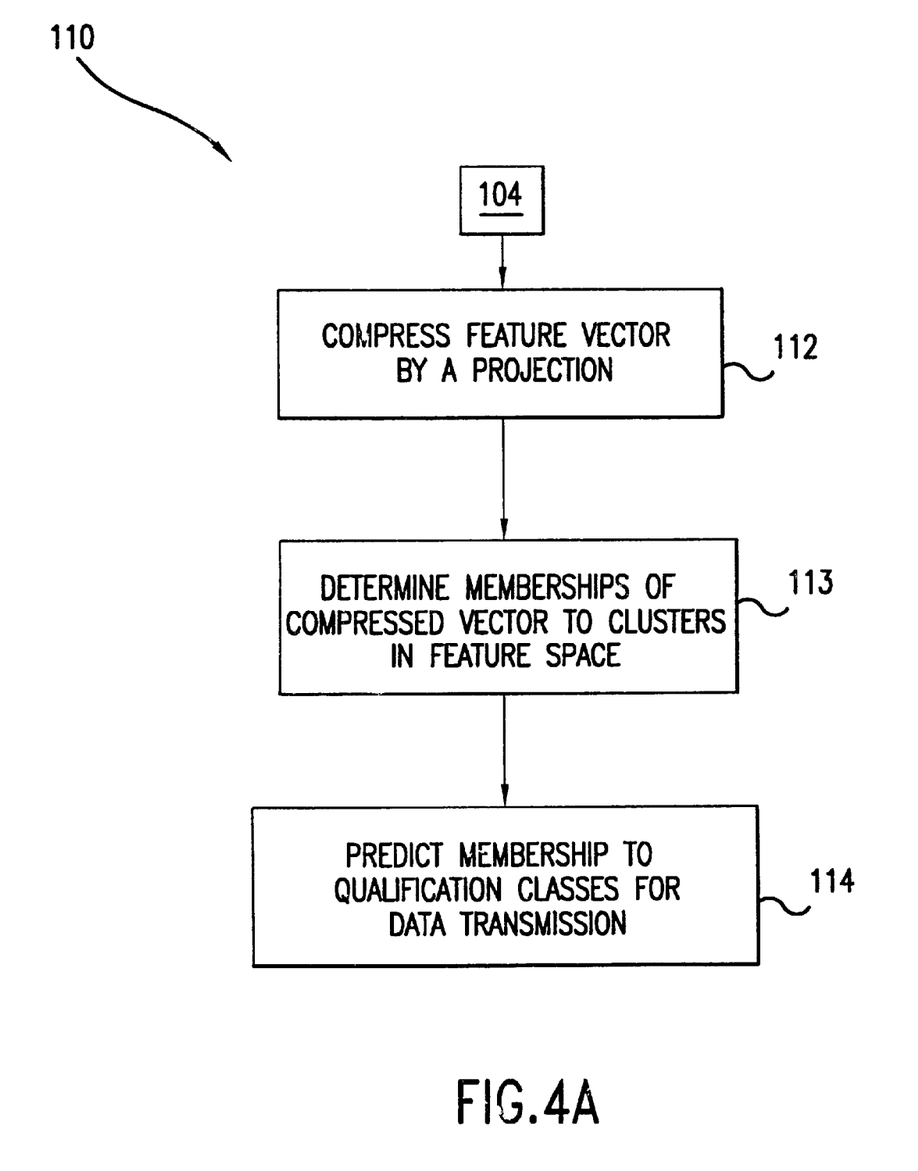
FIG. 4A is a flow chart showing a method of processing feature vectors through the neural network of FIG. 3A.

FIG. 4A is a flow chart 110 illustrating step 103 of FIG. 3A in which the computer 46 processes the feature vector to determine the qualification status of the associated line 12–14. The processing occurs sequentially in three layers of the neural network 115 shown in FIG. 4B.

Figure 4B:
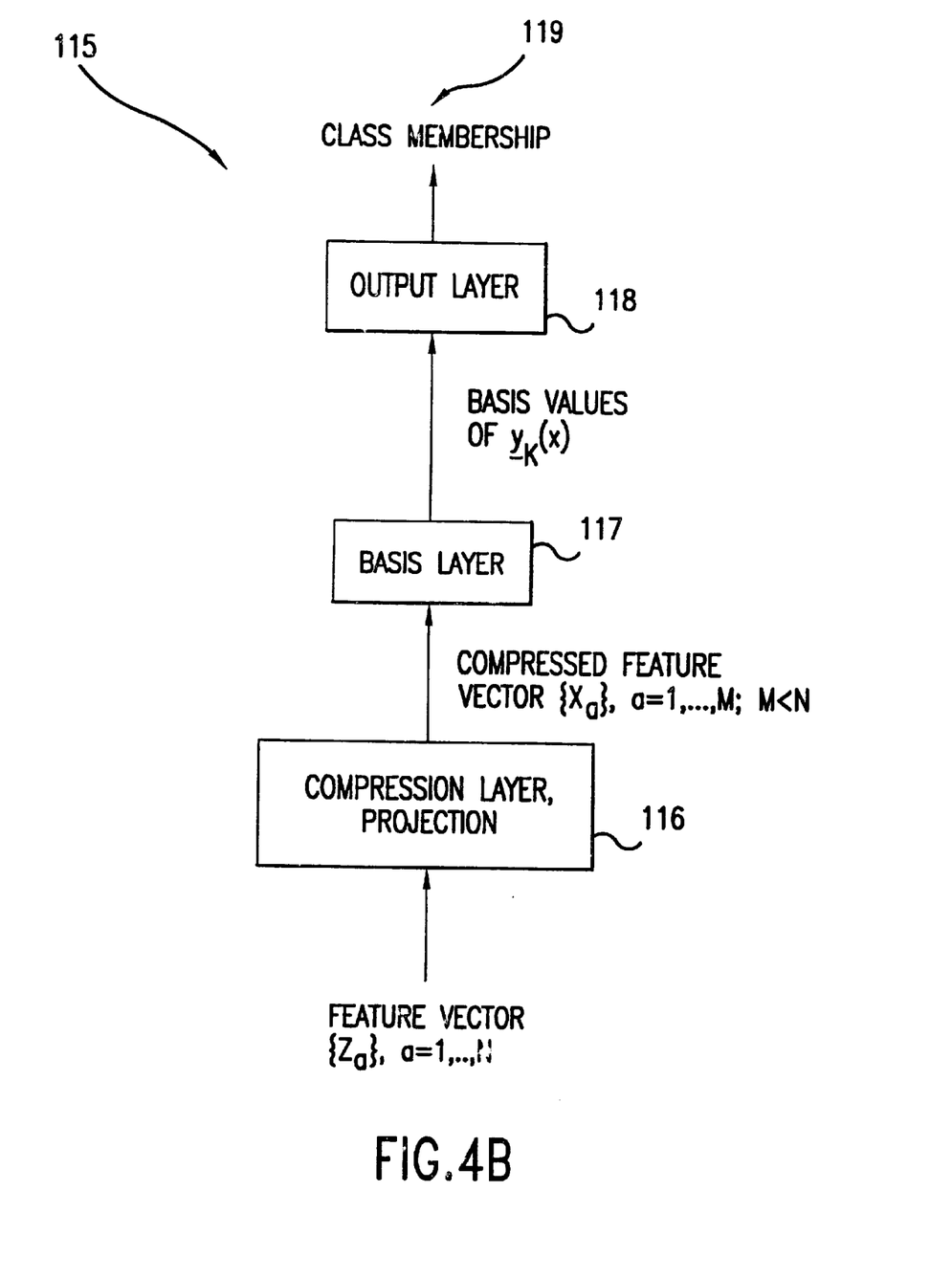
FIG. 4B is a block diagram showing the flow of data through the layers of the neural network of FIG. 4A.

In the first or compression layer 116 of the neural network 115, the computer 46 compresses a N-dimensional feature vector $Z_a$ by performing a projection into a preselected M-dimensional subspace of the entire N-dimensional feature space (step 112). To perform the projection, the computer 46 evaluates scalar products between the feature vector $Z_a$ and a special set of orthonormal basis vectors spanning the subspace. Since the subspace has a lower dimension (M<N), the projection produces a compressed feature vector $X_a$ with less components than the input feature vector $Z_a$ thereby making subsequent processing more rapid. The projection removes components of the feature vectors that do not vary substantially over sample lines of a training set. Such components are less indicative of the qualification status of the associated lines, because they have similar values for both qualified and disqualified lines.

In the second or basis layer 117 of the neural network 115, the computer 46 determines whether the compressed vector $X_a$ is a member of one or more clusters of feature vectors located in the projected subspace (step 113). To determine cluster memberships, the computer 46 evaluates fuzzy variables whose values represent probabilities of belonging to the clusters associated with the variables.

The clusters are localized groups of compressed feature vectors associated with the sample lines of the training set. Each cluster is located in the projected subspace of the entire feature space and can be modeled as a hyper-ellipsoidal region having a fuzzy boundary. Fuzzy functions on the clusters form the basis layer 117 of the neural network 115.

For a cluster K, the associated fuzzy variable $y_K$ is a fuzzy Horn clause. The value $y_K$ of the fuzzy Horn clause for a projected feature vector X is given by:

$$y_K(X) = \exp[-(X-V_K)^t D_K^2 (X-V_K)]$$

$V_K$ is the location of the center of the cluster K in the projected feature vector space. $D_K^2$ is a diagonal matrix whose entries, $\sigma_{Ki}^{-2}$, are the squared widths of the hyper-ellipsoidal region along directions "i". The $\sigma_{Ki}$'s express the fuzziness of the cluster K. The value $y_K(X)$ is indicative of the probability that the line 12–14 with projected feature vector X is a member of the cluster K.

In the last or output layer 118 of the neural network 115, the computer 46 predicts the selected line's membership to each qualification class (step 114). The class membership predictions produce confidence values $C_Q$ for membership to each qualification class, Q, recognized by the neural network. The confidence value $C_Q$ is defined by a class membership function whose form depends on an $r \times C$ matrix of weight parameters, $W_Q$. C is the number of clusters in the class Q, and r is a fixed non-negative integer that defines how results are biased, e.g., r=0 or 1. For class Q, the confidence value $C_Q$ is given by:

$$C_Q(X) = \{1 + \exp[-(X_r, 1)^t W_Q(Y(X))]\}^{-1}.$$

Here, Y(X) is the vector $[y_1(X), \ldots, y_c(X), 1]^t$ of the fuzzy variables representing the probabilities that the projected feature vector X is a member of the C clusters of the class Q. $X_r$ is a dimensionally reduced version of the projected feature vector X in which only the "r" most significant terms are retained.

The confidence values $C_Q$'s express a relationship between cluster membership and class membership. The relationship quantifies the fact that projected feature vectors of a single cluster have similar qualification class memberships.

For each feature vector, the neural network 115 generates a set of confidence values that indicate the probability of membership to each qualification class at the output 119. The computer 46 reports that the associated subscriber line 12–14 belongs to the qualification class for which the confidence value is highest.

The form of the neural network 115 is fixed by the parameters defining each of the three layers 116–118. The parameters define the feature space projection of the compression layer 116, the cluster geometry of the basis layer 117, and the weights of the output layer 118, which relate memberships to clusters and qualification classes.

Figure 5:
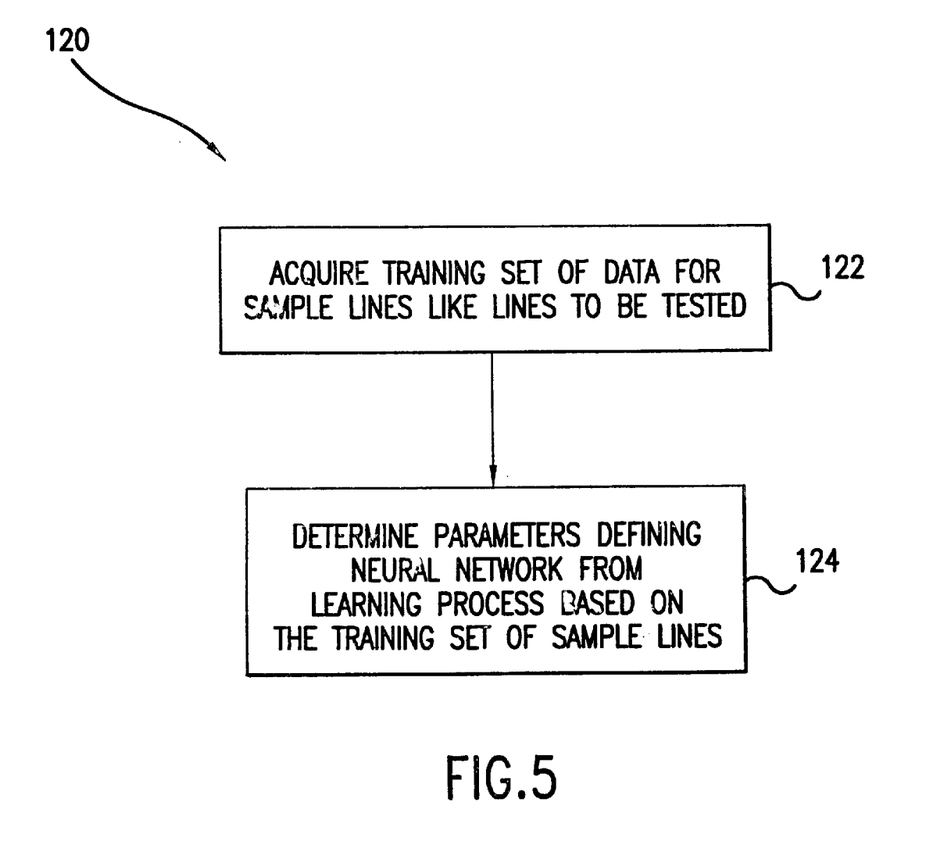
FIG. 5 is a flow chart showing a method of constructing the neural network of FIGS. 4A–4B.

FIG. 5 illustrates a method 120 for constructing the feed-forward neural network 115 used in FIGS. 3A, 4A, and 4B. To construct the neural network 115, data for a training set of sample lines is acquired through direct measurements and/or calculations (step 122). The data includes both an electrical feature vector and a qualification classification for each sample line. The properties of the sample lines belonging to the training set may correspond to the expected line properties for the unknown subscriber lines to be tested with the neural network 115. When such a correspondence exists, the neural network is generally expected to predict line qualification status with a higher accuracy. From the training set, the computer 46 determines the parameters that define the neural network 115 by a learning process (step 124).

Localizing both capacities to create and to use the neural network 115 on the same computer 46 leads to some advantages. Then, the system 11 is more adaptable to changes to the general population of subscriber lines 12–14. In response to changes, the computer 46 re-adapts the neural network 115 by recalculating the network parameters with a training set whose properties are more aligned with the changed population of subscriber lines 12–14.

Figure 6:
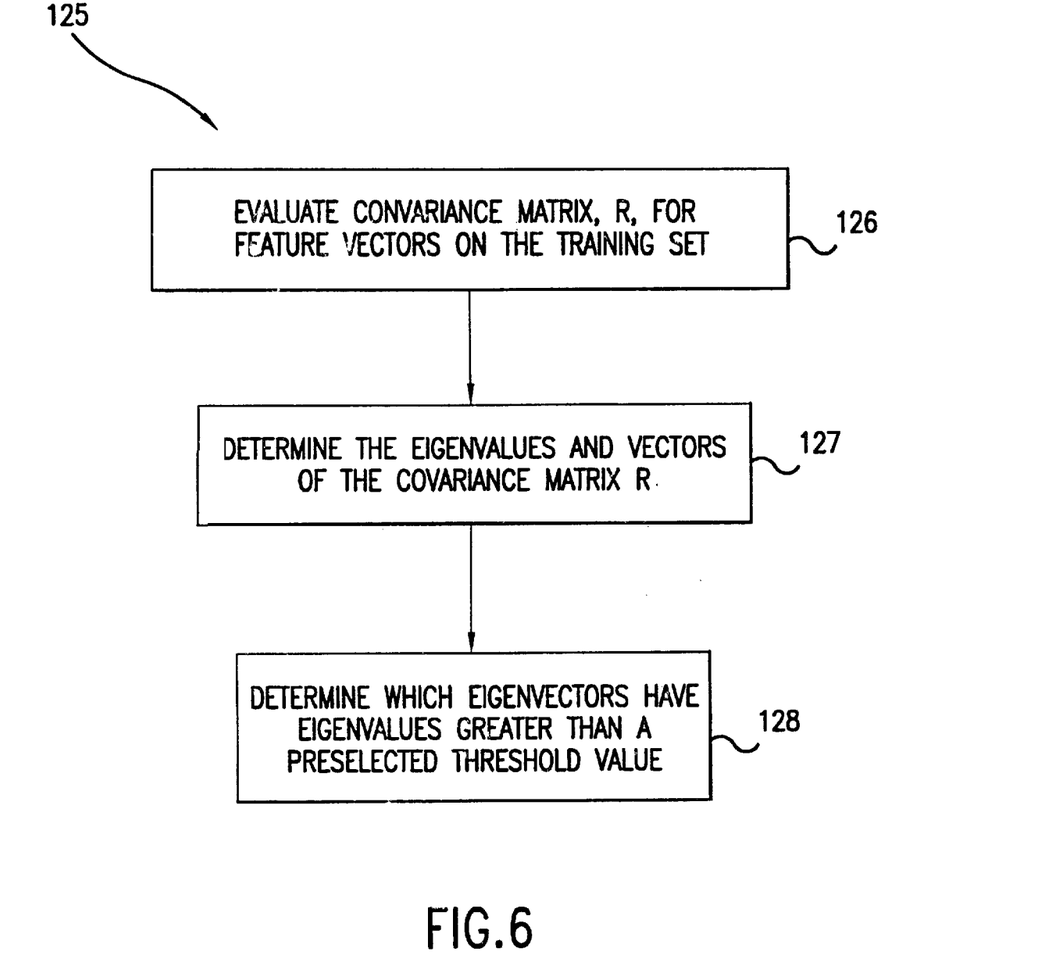
FIG. 6 is a flow chart showing a method of determining the compression layer of the neural network of FIGS. 4A–4B.

FIG. 6 is a flow chart illustrating a method 125 of determining the parameters that define the compression layer 116 of the neural network 115. The projection, which produces the compression, employs a Karhunen-Loeve (KL) transformation. The KL transformation provides an expansion of feature vectors with a special orthonormal basis of N vectors, $\phi_i$. In this basis, an arbitrary feature vector, X, is written as:

$$X = \Sigma^N_{i=1} k_i \phi_i + <X>.$$

Here, <> denotes an average over the sample lines in the training set, i.e., <X> is the average of the feature vector.

Each basis vector, $\phi_i$, is an eigenvector of a covariance matrix R, which is defined as an average over the feature vectors of the training set. The matrix R is:

$$R = <(X-<X>)(X-<X>)^t>.$$

The basis vectors $\phi_i$ satisfy the equations:

$$R\phi_i = \lambda_i \phi_i$$

in which the $\lambda_i$ are the eigenvalues.

To determine the parameters of the compression layer 116, the computer 46 evaluates the covariance matrix R on the feature vectors of the training set (step 126). Then, the computer 46 determines the eigenvalues and eigenvectors of the covariance matrix R (step 127).

In terms of the expansion over the special basis $\{\phi_i\}$, the compression layer 116 compresses a feature vector X by simply deleting components of vector X to produce a truncated vector, $X_P$. The truncated vector $X_P$ is given by:

$$X_P = \Sigma^M_{i=1} k_i \phi_i.$$

The truncation deletes the terms of the expansion of X over $\phi_i$'s corresponding to small eigenvalues $\lambda_i$ of the covariance matrix R. The retained terms correspond to $\phi_i$'s whose eigenvalues $\lambda_i$ are greater than a preselected threshold, e.g., $\max(\lambda_i)/250$ (step 128). The coefficients $(k_1, k_2, \ldots, k_M)$ for the retained terms are given by:

$$(k_1, k_2, \ldots, k_M) = (\phi_1, \phi_2, \ldots, \phi_M)^t \cdot X.$$

By only retaining M eigenvectors associated with the M largest eigenvalues, the dimension of the feature vectors is reduced by compression from N to M. The eigenvectors $\phi_i$, for $i=1, \ldots, M$, define the compression layer 116.

The truncation of the feature vector X generates an error vector "e", which is given by:

$$e = \Sigma^N_{i=M+1} k_i \phi_i.$$

The error vector "e", corresponds to a sum of squares error, $\epsilon$, which has the form:

$$\epsilon = \Sigma^N_{i=M+1} k_i k_i = \Sigma^N_{i=M+1} \phi_i^t (X-<X>)(X-<X>)^t \phi_i$$

Thus, the average of the error $\epsilon$ over the training set is:

$$<\epsilon> = \Sigma^N_{i=M+1} \phi_i^t R \phi_i = \Sigma^N_{i=M+1} \lambda_i.$$

Since the $\lambda_i$ appearing in $<\epsilon>$ are the smallest eigenvalues of R, the feature space projection of step 112 is optimal. The feature space projection reduces the size of feature vectors and generates minimal "average" errors. For example, one embodiment that truncates eigenvectors having eigenvalues smaller than $\max(\lambda_i)/250$ removes about two thirds of the components of feature vectors.

Figure 7:
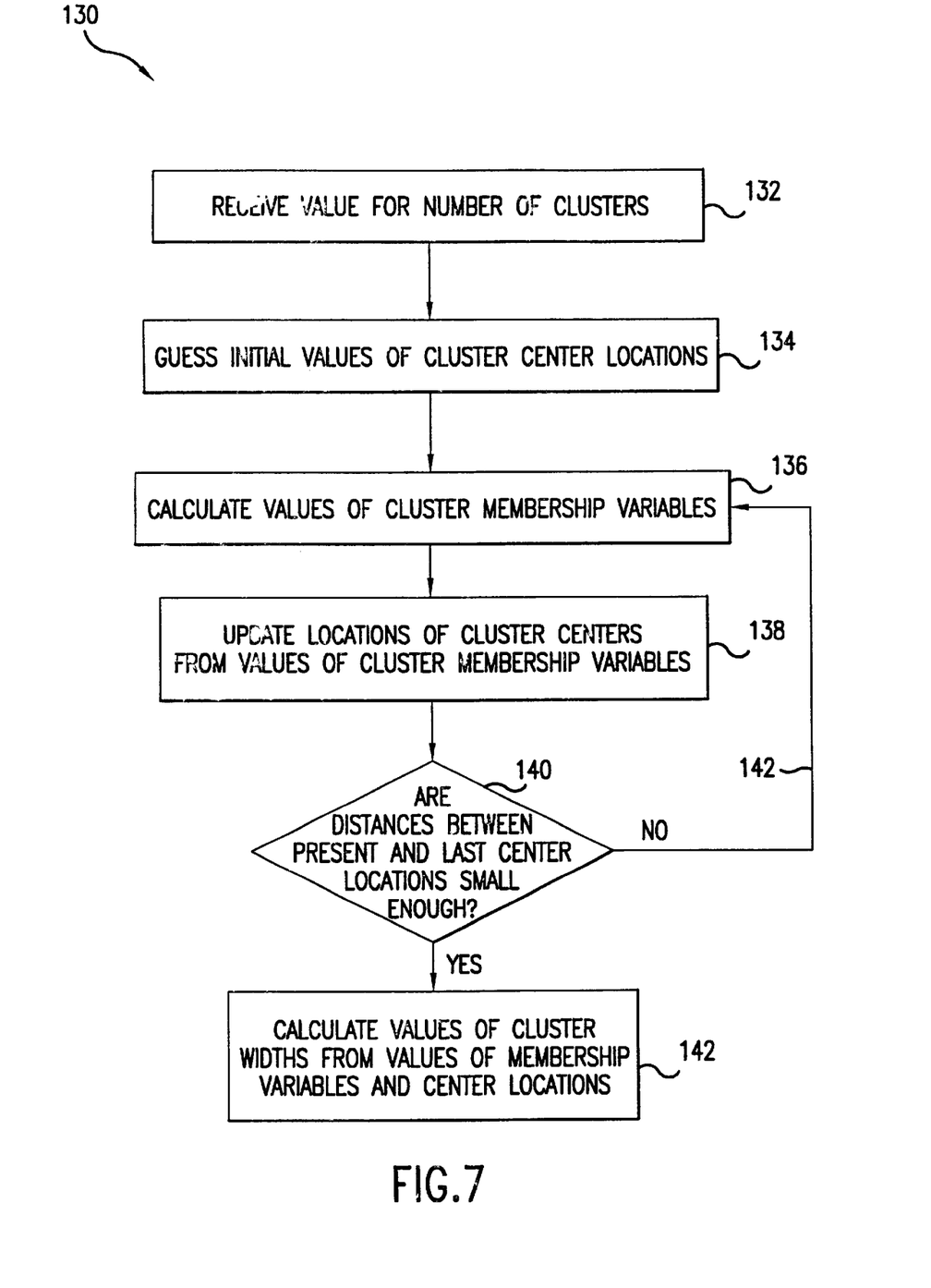
FIG. 7 is a flow chart showing a method of determining the basis layer of the neural network of FIGS. 4A–4B.

FIG. 7 is a flow chart illustrating a method 130 of determining the parameters that define the basis layer 117 of clusters in projected feature space. The method uses fuzzy C-means clustering to recursively determine the basis layer from the data in the training set. At each recursion, both the center location $V_a$ of each cluster "a" and the membership values $\mu_{ma}$ are updated by minimizing a fuzzy cost function, E, over the data in the training set. Minimizing E reduces inter-cluster overlaps by grouping together projected feature vectors based on both geometry and a relation. The relation assigns each feature vector of the training set to the clusters of a single qualification class, i.e., to the class to which the associated sample line belongs. Thus, each feature vector of the training set is used to construct the clusters of one qualification class.

For each class, the fuzzy cost function E provides a fuzzy measure of clustering. Each fuzzy cost function E is defined by:

$$E = \Sigma^C_{a=1} \Sigma_m (\mu_{ma})^{fuzz} |X_m - V_a|^2.$$

where the sum runs over the "C" clusters of the associated qualification class. For each projected feature vector $X_m$, the fuzzy variables $\mu_{ma}$ are indicative of membership to cluster "a". When summed over the C clusters of the class to which the associated sample line belongs, the $\mu_{ma}$ add up to one, i.e., $\Sigma^C_{a=1} \mu_{ma} = 1$.

To find the parameters defining the functions of the basis layer 117, the computer 46 searches for clusters in the distribution of projected feature vectors for the training set. Before starting a search, the computer 46 receives a value for the number C of clusters in a qualification class, e.g., a guessed value of C provided by an operator (step 132). After receiving the number of clusters, the computer 46 guesses the center location $V_a$ for each cluster "a" of the class (step 134). From the guessed center locations, the computer 46 calculates values for cluster membership variables $\mu_{ma}$ associated with each feature vector $X_m$ of a sample line in the same class (step 136). The cluster membership variables are found from the center locations, by solving the equations:

$$(\mu_{ma})^{-1} = \Sigma^C_{a'=1}[\{|X_m - V_a|/|X_m - V_{a'}|\}]^{2/(fuzz-1)}.$$

In which "fuzz" is a preselected fuzziness parameter. Fuzz is greater than 1, e.g., fuzz may be between 1.6 and 1.7.

Using the cluster membership variables $\mu_{ma}$'s, the computer 46 updates the center locations, i.e., the $V_a$'s, of the clusters (step 138). The updated center locations are determined from the equation:

$$V_a = [\Sigma_m (\mu_{ma})^{fuzz} X_m]/[\Sigma_{m'}(\mu_{m'a})^{fuzz}]$$

The sums are over projected feature vectors $X_m$ and $X_{m'}$ of the training set. Next, the computer 46 determines whether distances between the present and last values of the center locations of the clusters are small enough, i.e., less than a preselected threshold value (step 140). If any differences exceed the threshold value, the computer 46 executes loop 142 to start another cycle of updating the geometric variables $V_a$ and $\mu_{ma}$, which define the clusters.

If all the distances between present are below the threshold value, the computer 46 calculates the widths of each cluster (step 142). Since each cluster "a" is a hyper-ellipsoidal region, the width $\sigma_{ab}$ of cluster "a" along direction "b" is related to the range of projected feature vectors belonging to the cluster "a" along the direction "b".

One definition of the width $\sigma_{ab}$ is given by:

$$\sigma_{ab} = \Sigma_m (\mu_{ma\ m} |X_{m,\ b} - V_{a,\ b}|^2)^{1/2}$$

Here, the component of a vector Z along direction "b" is indicated by $Z_{,b}$.

Figure 8:
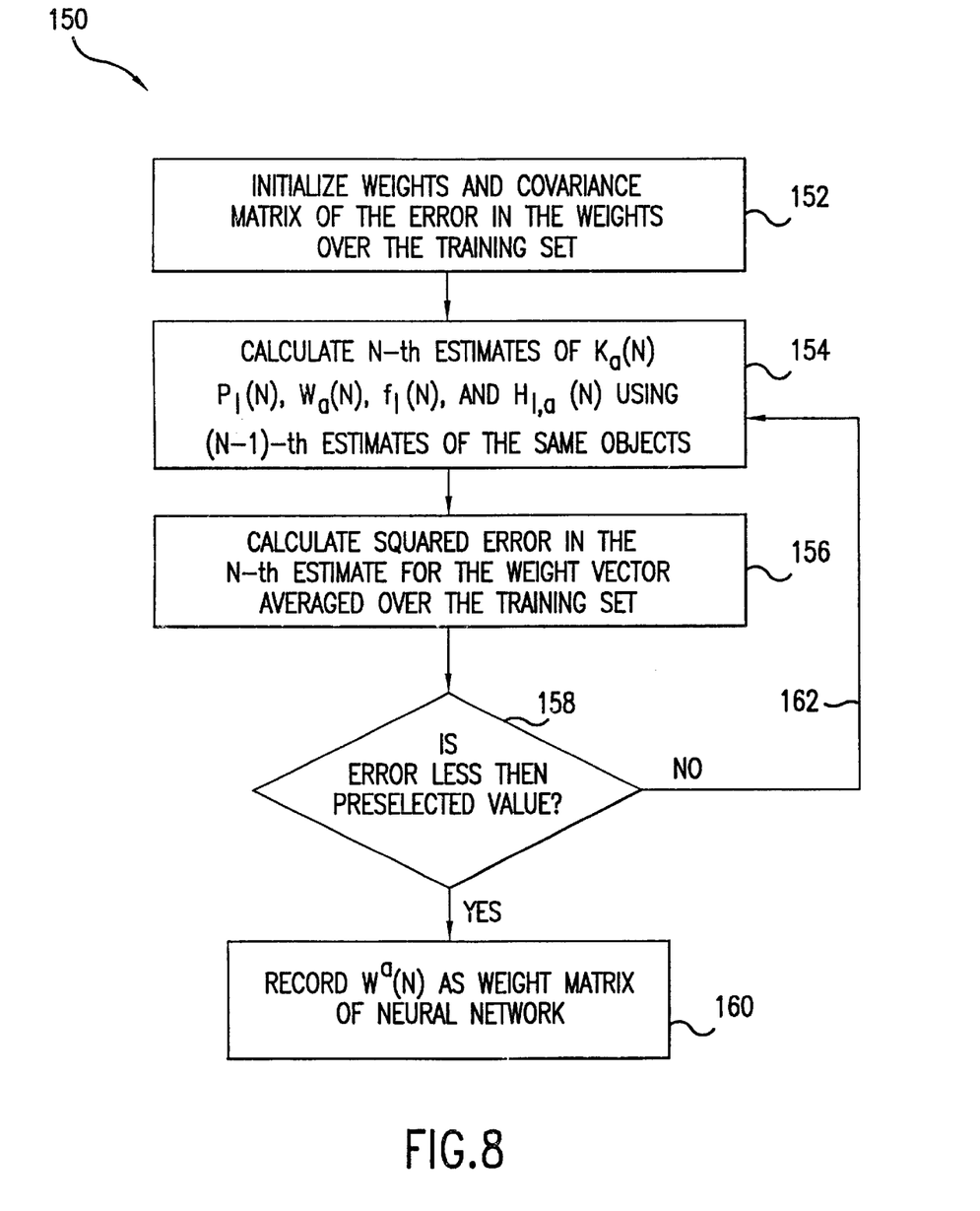
FIG. 8 is a flow chart showing a method of determining the weights the output layer of the neural network of FIGS. 4A–4B.

FIG. 8 is a flow chart illustrating an iterative method 150 of determining the weights $W_Q$ in the class membership functions $C_Q(X)$. The method is based on a Gaussian noise model for the learning process in which the N-the recursive estimate for the confidence value $Z_1$ is given by:

$$Z_1(N) = f_1(N) + \delta_1.$$

The model's noise, $\delta_1$ is Gaussian and has zero mean, i.e., $<\delta_1> = 0$, and a variance $<\delta_1 \delta_1> = \Omega_1^2$.

The weight parameters $W_Q$ are determined by using an extended Kalman estimator. The extended Kalman estimator approximates the nonlinear function $f_1(N)$ of the weights $W_Q$ by linearizing the dependence on $W_Q$ to obtain the form:

$$Z_1(N) = \Sigma_a H_{1,\ a}(N) W^a(N) + \delta_1 \text{ with } H_{1,\ a}(N) = \partial f_1(N)/\partial W^a(N).$$

Henceforth, the index "a" includes all matrix-indices of the weight matrix $W^a(N)$. $W^a(N)$ is the Nth recursive estimate to the optimal weight matrix $W^a(\infty)$ To determine the weight matrix, the computer 46 employs a recursive algorithm. The computer 46 initializes the weights and the covariance, P(N), for the error, Er(N), in the weights, i.e., $Er(N) = W^a(N) - W^a(\infty)$, over the training set (step 152). For the Nth estimate, the error in the weights is: $Er(N) = W_a(N) - W_a(\infty)$. The initial values or the 0th estimate can be chosen to be: $P(0) = 10^3 I$ and $W^a(0) = 0$ where I is the unit matrix on the space of weight matrices $W^a$.

The computer 46 calculates new or Nth estimates of $K^a(N)$, $P_1(N)$, $W^a(N)$, $f_1(N)$, and $H_{1,a}(N)$ using the last or (N−1)th estimates to these quantities (step 154). At the Nth iteration, the calculation entails solving the following equations sequentially:

$$K_a(N) = \Sigma_b P_{1,\ ab}(N-1) H_{1,b}(N-1)^t / (\Omega_1^2 + H_1(N-1) P_1(N-1) H_1(N-1)^t),$$

$$P_1(N) = [I - \Sigma_a K_a(N) H(N)_{1,a}] P_1(N-1),$$

$$W^a(N) = W^a(N-1) + K_a(N)[M_1(X) - f_1(N-1)],$$

$$f_1(N) = f_1(W^a(N)),$$

and $$H_{1,\ a}(N) = \partial f_1(N)/\partial W^a(N).$$

The update is performed for each vector X in the training set. $M_1(X)$ is the actual class membership value of X in class "1", i.e., 1 or 0. After calculating the Nth approximation for each feature vector, the computer calculates the squared error in the weight vectors averaged over the training set, i.e., $<tr[P_1(N)]>$ (step 156). The computer 46 determines whether the error, i.e., $<tr[P_1(N)]>$, is less than a preselected value (step 158). If the error is below the preselected value, the computer 46 records the value of the weight matrix as the form to be used in the neural network 115 (step 160). Otherwise, the computer 46 performs a loop 162 to calculate the (N+1)th estimated, i.e., $K_a(N+1)$, $P_1(N+1)$, $W^a(N+1)$, $f_1(N+1)$, and $H_{1,\ a}(N+1)$.

Other embodiments are within the scope of the following claims.

What is claimed is:

1. A method of testing a subscriber line, comprising:
   determining values of electrical line features from electrical measurements on the subscriber line; and
   processing a portion of the values of the electrical features with a neural network that predicts whether the line qualifies to support one or more preselected data services from the portion of the values,
   wherein the measurements are one-ended electrical measurements, and further comprising
   compressing a vector whose components are the electrical features into a subspace; and
   predicting whether the line qualifies based on the compressed vector.

2. The method of claim 1, wherein a line qualifies for one of the data services if the line attenuates data at a preselected frequency by less than a preselected amount.

3. The method of claim 2, wherein the preselected frequency is substantially higher than the frequencies of the electrical measurements.

4. The method of claim 2, wherein the data services comprise one of ISDN and ADSL.

5. The method of claim 2, wherein the data service is one of ISDN and ADSL.

6. The method of claim 2, further comprising:
   determining whether the subscriber line has a line fault.

7. The method of claim 6, further comprising:
   predicting whether the line qualifies for one of the selected data services, the prediction based in part on whether the line has a line fault.

8. The method of claim 6, wherein the line fault includes one of a bridged tap, a gauge change, a split pair, a resistive imbalance, a load coil, a metallic fault, and a capacitive imbalance.

9. The method of claim 1, wherein the measurements are performed through a test access of a switch.

10. The method of claim 1, wherein variances of lengths of components of a set of sample lines have smaller values in an orthogonal complement of the subspace than in the subspace.

11. The method of claim 1, wherein the processing comprises:

determining whether the vector belongs to a cluster of feature vectors, each feature vector of the cluster being associated with a sample line of a training set.

12. The method of claim 11, wherein the vector belongs to the cluster in response to being within a geometrical region defined by the feature vectors of the training set that belong to the cluster.

13. The method of claim 11, further comprising:

predicting that the subscriber line is qualified for a particular data service in response to the vector belonging to one of the clusters defined by feature vectors of sample lines that are qualified for the particular data service.

14. The method of claim 11, further comprising:

predicting that the subscriber line is disqualified for a particular data service in response to the vector belonging to one of the clusters defined by feature vectors of sample lines that are disqualified for the particular data service.

15. A method of constructing a test for qualifying subscriber lines for data transmissions, comprising:

obtaining electrical feature and qualification data for sample lines of a training set;

determining parameters defining a neural network from the data of the training set, the network is configured to use values of electrical properties of a subscriber line to predict whether the subscriber line qualifies for one or more preselected data services, wherein determining comprises finding a projected subspace in a space of vectors, components of each vector being the electrical features of an associated one of the sample lines.

16. The method of claim 15, wherein a line qualifies for one of the data services if the line attenuates data at a preselected frequency by less than a preselected amount.

17. The method of claim 16, wherein one of the preselected data services is one of ADSL and ISDN.

18. The method of claim 15, wherein the electrical features include one-ended electrical measurements and at least one property calculated from the one-ended measurements.

19. The method of claim 18, wherein determining parameters comprises learning a portion of the parameters from the training set.

20. The method of claim 16, wherein a portion of the components of the vectors in the projected subspace have larger variances over the training set than components of the vectors orthogonal to the subspace.

21. The method of claim 16, wherein determining comprises identifying clusters in a distribution of the vectors in the projected subspace.

22. The method of claim 16, wherein identifying includes determining parameters for cluster sizes and locations.

23. The method of claim 16, wherein determining further comprises:

finding weights that correlate membership in a cluster to qualification for one of the preselected data services.

24. A data storage medium storing a computer executable program for a method of testing a subscriber line, the method comprising:

determining values of electrical line features from electrical measurements on the subscriber line; and processing a portion of the values of the electrical features with a neural network that predicts whether the line qualifies to support one or more preselected data services from the portion of the values;

compressing a vector whose components are the electrical features into a subspace; and predicting whether the line qualifies based on the compressed vector.

25. The medium of claim 24, wherein a line qualifies for one of the data services if the line attenuates data at a preselected frequency by less than a preselected amount.

26. The medium of claim 25, further comprising: determining whether the subscriber line has a line fault.

27. The method of claim 25, wherein the measurements are one-ended electrical measurements.

28. The medium of claim 24, wherein the preselected frequency is substantially higher than the frequencies of the electrical measurements.

29. The medium of claim 28, wherein the processing comprises:

determining whether the vector belongs to a cluster of feature vectors, each feature vector of the cluster being associated with a sample line of a training set.

30. The medium of claim 29, wherein the vector belongs to the cluster in response to being within a geometrical region defined by the feature vectors of the training set that belong to the cluster.

31. The medium of claim 29, the method further comprising:

predicting that the subscriber line is qualified for a particular data service in response to the vector belonging to one of the clusters defined by feature vectors of sample lines that are qualified for the particular data service.

32. The medium of claim 29, the method further comprising:

predicting that the subscriber line is disqualified for a particular data service in response to the vector belonging to one of the clusters defined by feature vectors of sample lines that are disqualified for the particular data service.

33. The medium of claim 27, wherein variances of lengths of components of a set of sample lines have smaller values in an orthogonal complement of the subspace than in the subspace.

34. The medium of claim 24, wherein the one or more data services comprise one of ISDN and ADSL.

35. A method of testing a subscriber line, comprising:

determining values of electrical features of the line from electrical measurements on the subscriber line; and forming a vector having the values as components;

determining whether the vector is a member of a cluster of feature vectors, feature vectors of the cluster being associated with a sample lines of a training set; and predicting whether the line qualifies for a data service based in part on the determination of cluster membership, and projecting out a portion of the components of the vector having features of the subscriber line as components; and wherein the act of determining membership is based on the compressed vector.

36. The method of claim 35, wherein a line qualifies for the data service if the line attenuates data signals at a preselected frequency by less than a preselected amount.

37. The method of claim 36, wherein the preselected frequency is substantially higher than the frequencies of the electrical measurements.

38. The method of claim 35, wherein the measurements are one-ended electrical measurements.

39. The method of claim 35, wherein the vector belongs to the cluster in response to being within a geometrical region defined by the feature vectors of the training set that belong to the cluster.

* * * * *